July 14, 1953     D. E. GULICK     2,645,449
FAUCET WITH PRESSURE SEALED EXPANDING WASHER VALVE SEAT
Filed April 28, 1948
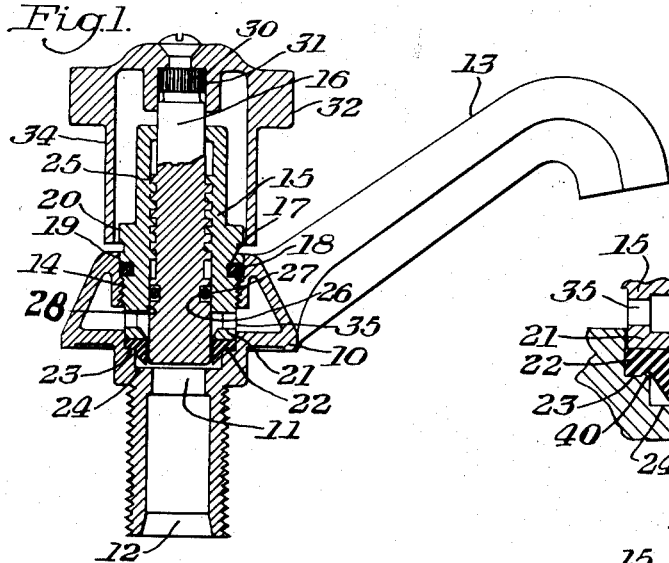
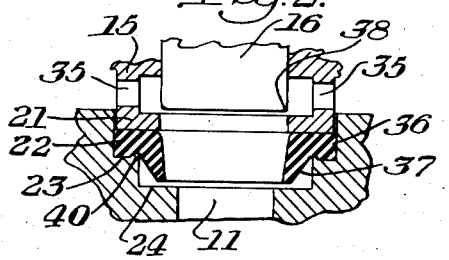
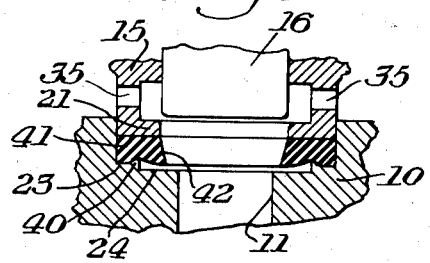
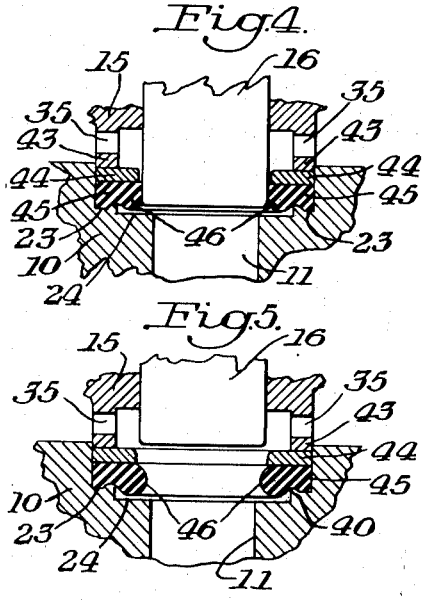
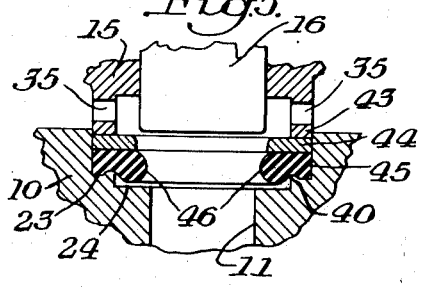
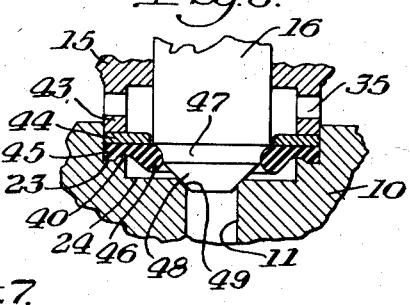
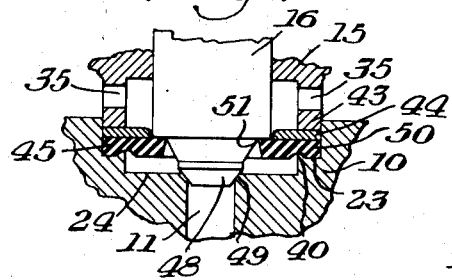
INVENTOR.
David E. Gulick
BY
his atty Patented July 14, 1953

2,645,449

UNITED STATES PATENT OFFICE 2,645,449

FAUCET WITH PRESSURE SEALED EXPANDING WASHER VALVE SEAT

David E. Gulick, Kittanning, Pa., assignor to Eljer Co., Ford City, Pa., a corporation of Pennsylvania Application April 28, 1948, Serial No. 23,692

3 Claims. (Cl. 251—27)

1

This invention relates generally to valves, and more particularly to faucets employed as water tap outlets on lavatories, sinks, tubs and the like.

Ordinary water taps or faucets have a movable stem, the end of which has secured thereto a flat washer arranged to be pressed against an opposed seat on the valve body to stop the flow of water therethrough. Repeated use with the application of pressure on the washer against its seat causes both to wear and leak. The life of this type of washer has been increased by improvements in the material from which such washers are made and in swiveling the washer on the stem. However, if the tap is not closed with sufficient firmness a slight leak will occur permitting the water to drip which will quickly erode a notch across the face of the seat again. A hard foreign substance caught on the seat or washer may produce a scar causing leakage and wear of the washer. A scar or scratch on the seat will eventually grow larger creating greater leakage and will tear the surface of the washer. Another disadvantage with the ordinary flat washer is the manner of holding it on the stem. Even though the washer is retained by a screw in a socket formed on the end of the stem, the screw frequently becomes loose and causes trouble. The washer swivel joints materially decrease such cause of wear. However, the water faucet structure, comprising this invention, avoids each of these difficulties by providing concentric coacting valve parts having relative axial movement to shut off the water and which do not rely on compressive forces against a flat washer for the valve action. The stem stop of this improved valve is entirely independent of the valve members and may or may not be a function of valve closure or pressure. One member of this improved valve is flexible and is not held in place by a screw head nor subjected to destructive valve pressure forces.

Other objects and advantages appear in the following description and claims.

The accompanying drawings show, for the purpose of exemplification without limiting the invention or claims thereto, certain practical embodiments of the invention wherein:

Fig. 1 is a view in vertical section of a faucet comprising this invention;

Fig. 2 is an enlarged sectional view of the seat washer shown in Fig. 1 with parts broken away;

Fig. 3 is a view similar to Fig. 2 with a modified form of seat washer;

Fig. 4 is an enlarged sectional view with parts broken away of a seat washer having an annular rim of circular cross-section;

2

Fig. 5 is a view similar to Fig. 4 showing the stem withdrawn from the washer;

Fig. 6 is an enlarged sectional view with parts broken away showing a modified form of valve stem and washer; and Fig. 7 is a view similar to Fig. 6 showing a flat face seat washer.

Referring to Figs. 1 and 2 of the drawings, 10 represents a valve body provided with the passageway 11 which connects the inlet 12 with the outlet or spout 13. The upper end of the body 10 is provided with a threaded opening 14 for receiving the bushing 15 that contains the stem 16.

The bushing 15 is provided with an annular groove 17 substantially of square cross-section and arranged to receive the sealing ring 18 of circular cross-section which engages the smooth cylindrical bore 19 on the body 10 above the bushing securing threads. The bushing 15 is also provided with a non-round section 20 for the purpose of tightly screwing the same into the body member 10. The lower end of the bushing is provided with an annular foot 21 arranged to engage the seat washer 22, the outer perimetral portion of which rests on the shoulder 23 of the body member. The body 10 is provided with a shoulder 24 below the shoulder 23 which lies in the path of the stem 16 and will be engaged thereby if the stem is rotated so that the operating threads 25 force it downwardly through the washer 22. The stem 16 is likewise provided with an annular groove 26 for receiving the sealing ring 27 of circular cross-section which is arranged to seal in the bore 28 of the bushing 15.

The upper end of the stem 16 extends above the bushing and is provided with a knurl head 30 which receives the complemental knurl socket 31 on the underside of the winged handle 32. The top of the stem is also provided with a threaded axial hole for receiving the screw which holds the handle 32 on the stem 16. The underside of the handle 32 is provided with an annular depending skirt 34 that will extend substantially to the top of the body 10 when the stem 16 engages the shoulder 24. The skirt 34 thus hides the exterior of the bushing 15 and the latter need not be polished and chromium plated. It also prevents dirt or other foreign matter from collecting on the stem 16.

If the lower end of the stem 16 engages the shoulder 24 it functions as a stop and also acts as a valve in closing the passageway 11. Immediately above the foot 21 the bushing is provided with the radial passageways or windows 35 which permit the flow of fluid from the inlet 12 through the passageway 11, the central opening of the seat washer 22, the radial openings 35 to the outlet or spout 13. In Fig. 1 the lower end of the stem is shown to be disposed within the central opening or bore of the seat washer 22 and the pressure of the water is effective against the skirt to tightly seal it on the stem, whereas in Fig. 2 the stem has been retracted therefrom to permit the passage of fluid.

As shown in Fig. 2, the cross-section of the perimeter 36 of the seat washer 22 is substantially rectangular and has an annular depending skirt 37 surrounding its central opening or bore. The skirt 37 decreases in cross-section to the lower end thereof and provides a downwardly tapering bore. The seat washers comprising this invention are made of an elastomer such as rubber or suitable plastic material which may be stretched or expanded by the insertion of the valve stem 16 therein. Thus, when the valve stem 16 passes through the foot 21 it retards the flow of fluid through the valve and, upon further movement, the smooth and highly polished chromium cylinder wall of the stem 16 engages the bore of the skirt 37 of the seat washer 22 thereby sealing or shutting off the flow of fluid through the passageway 11. Further movement of the valve stem through the washer causes the skirt to expand and tightly embrace the polished cylindrical surface of the valve 16. The lower edge of the valve stem 16 is beveled as indicated at 38 so that it will not cut or otherwise tear the seat washer 22. As the valve stem continues through the skirt 37 it acts as a valve member seating on the shoulder 24 of the body as well as the stop, the end of the stem functioning as the valve and the shoulder 24 functioning as the seat. The engagement of the end of the stem with the seat 24 will not in any way harm the cylindrical portion of the stem that engages the tapered bore of the skirt on the seat washer 22.

The shoulder 23 may be provided with an upwardly projecting annular rib 40 along its inner marginal edge for the purpose of squeezing the seat washer 22 when clamped on its seat by the bushing 15. The rib 40 upon squeezing the washer confines its flexibility to the inner perimetral portion preventing the outer perimetral portion from movement that would break the seal and unseat the washer. This upwardly projecting annular rib 40 thus aids in firmly holding the washer 22 in sealed engagement in the passageway 11 and prevents it from being drawn or pulled to the center of the passage and out of position.

The structure shown in Fig. 3 is substantially the same as that shown in Fig. 2 with the exception that the seat washer 41 is not provided with a long skirt but has a tapered opening 42. This seat washer has a short skirt and a tapered central opening 42.

The structures shown in Figs. 4 and 5 are similar, differing only in that the stem is shown in its inserted and retracted positions, respectively. The bushing 15 is provided with a foot 43 which does not have an inturned flange in the manner illustrated with reference to Figs. 1 to 3. A washer 44 is employed in place of the inturned flange on the foot 21 and engages the upper surface of the seat washer 45 providing a structure similar to that shown on the previous figures. However, the central opening of the seat washer 45 is provided with an annular bead of substantially circular cross-section as illustrated at 46 in Fig. 5. This bead extends beyond the central opening of the washer 44 and is deformed by the valve stem 16 as shown in Fig. 4.

In each of the structures previously discussed the cylindrical surface of the valve stem 16 was employed to seal in the central opening or bore of the seat washers. In the modifications shown in Figs. 6 and 7 a portion of the end face of the stem 16 is employed to engage the seat washers for the purpose of closing or controlling the flow of fluid through the passageway 11. In Fig. 6 the seat washer structure is the same as that illustrated in Figs. 4 and 5. However, the bore of the washer 45 is smaller in diameter than the stem to permit the annular arcuate surface 47 on the end of the stem 16 to engage a complement surface of the bead 46 of the washer 45. After the bead 46 is engaged by the annular surface 47 the bevel surface 48 of the valve stem engages the bevel seat 49 on the valve body to maintain the passageway 11 closed. In the structure shown on Fig. 7 the elastomer seat washer member 50 is flat and its inner end is arranged to be engaged by the radial shoulder 51 on the valve stem 16. This valve stem is likewise provided with a bevel surface 48 on the end of the valve stem for engaging the bevel seat 49 in the body 10 of the valve.

In each instance the pressure of the fluid in the inlet 12 is effective on the elastomer washer to aid in holding it tightly against the surface of the valve stem 16. Obviously, the elastomer seat washer shown in Figs. 2, 3 and 4 will grip the cylindrical surface of the valve stem with greater pressure when it is inserted in the central opening of these washers owing to the fact that this central opening is slightly smaller in diameter than that of the valve stem causing an initial pressure between the surface engagement of these members, which initial pressure is increased by the pressure of the fluid subjected to the inlet 12.

While, for clarity of explanation, the preferred embodiments of this invention have been shown and described, it is to be understood that this invention is capable of many modifications, that changes in the construction and arrangement may be made therein and some parts may be employed without conjoint use of other parts and without departing from the spirit and scope of this invention.

I claim:

1. In a faucet valve, the combination of a body having a passage with inlet and outlet openings, an annular shoulder in said passage, an upwardly extending annular rib adjacent the inner periphery of said shoulder, a resilient washer having its outer perimetral portion seated on and covering said shoulder and engaged by said rib and its inner perimetral portion extending into said passage beyond said shoulder and defining an annular opening, a bushing removably received in said body and engaging the outer perimetral portion of the resilient washer to press it on said shoulder and squeezing it against said annular rib to confine the flexibility of the resilient washer to the inner perimetral portion adjacent said opening and to hold the resilient washer in secure and sealed relation on said shoulder, said bushing having lateral annular openings for the passage of fluid from the inlet to the outlet, and a valve having a smooth uninterrupted cylindrical portion larger in diameter than the opening in said resilient washer and movably mounted in said bushing for entering said opening in said resilient washer and expanding the same by flexing the washer in said confined inner perimetral portion to control and stop the flow of fluid through the passage without disturbing the seating of said resilient washer.

2. The structure of claim 1 which also includes an additional annular seat in said passage below said resilient washer and against which the end of the cylindrical valve may seat to close the same.

3. The structure of claim 1 which also includes a nonresilient washer between said bushing and the outer perimetral portion of said resilient washer and having a larger annular opening than the latter.

DAVID E. GULICK.

References Cited in the file of this patent

UNITED STATES PATENTS

| Number | Name | Date |
|---|---|---|
| 1,551,683 | Muchnic | Sept. 1, 1925 |
| 1,570,568 | Howell | Jan. 19, 1926 |
| 1,919,856 | McGeorge | July 25, 1933 |
| 1,957,567 | Williams | May 8, 1934 |
| 2,046,030 | Muend | June 30, 1936 |
| 2,087,185 | Dillon | July 13, 1937 |
| 2,089,848 | Hoferle | Aug. 10, 1937 |
| 2,322,139 | Kaelin | June 15, 1943 |
| 2,360,733 | Smith | Oct. 17, 1944 |
| 2,388,710 | Sanford | Nov. 13, 1945 |
| 2,391,582 | Martin | Dec. 25, 1945 |
| 2,420,589 | Dunniho | May 13, 1947 |
| 2,434,262 | Delany | Jan. 13, 1948 |
| 2,485,092 | Gannon | Oct. 18, 1949 |
| 2,509,656 | Tomoser | May 30, 1950 |
| 2,574,054 | Miller | Nov. 6, 1951 |

FOREIGN PATENTS

| Number | Country | Date |
|---|---|---|
| 298,852 | Great Britain | of 1928 |
| 303,091 | Great Britain | of 1928 |
| 356,377 | Great Britain | of 1931 |
| 367,489 | Great Britain | of 1931 |